United States Patent [19]
Choo et al.

[11] Patent Number: 5,840,158
[45] Date of Patent: Nov. 24, 1998

[54] COLLOIDAL SILICA/POLYELECTROLYTE BLENDS FOR PULP AND PAPER APPLICATIONS

[75] Inventors: Pek Lee Choo; Bruce A. Keiser, both of Naperville; Michio Kobayashi, Aurora; Maureen B. Nunn, Naperville; David A. Picco, Shorewood; Kristine S. Salmen, Naperville, all of Ill.

[73] Assignee: Nalco Chemical Company, Naperville, Ill.

[21] Appl. No.: 834,915

[22] Filed: Apr. 7, 1997

Related U.S. Application Data

[63] Continuation-in-part of Ser. No. 535,430, Sep. 28, 1995, Ser. No. 613,791, Nov. 26, 1995, Pat. No. 5,620,629, and Ser. No. 701,224, Aug. 21, 1996, Pat. No. 5,667,697.

[51] Int. Cl.⁶ .................................................... D21H 21/10
[52] U.S. Cl. ................................... 162/164.3; 162/164.6; 162/168.2; 162/168.3; 162/175; 162/181.6
[58] Field of Search ............................... 162/164.3, 164.6, 162/168.2, 168.3, 175, 181.6

[56] References Cited

U.S. PATENT DOCUMENTS

| | | |
|---|---|---|
| 3,822,216 | 7/1974 | Schaefer . |
| 3,855,145 | 12/1974 | Vossos . |
| 3,867,304 | 2/1975 | Mindick et al. . |
| 4,153,548 | 5/1979 | Forney . |
| 4,388,150 | 6/1983 | Sunden et al. . |
| 4,568,721 | 2/1986 | Fong et al. . |
| 4,753,710 | 6/1988 | Langley et al. . |
| 4,795,531 | 1/1989 | Sofia et al. . |
| 4,863,615 | 9/1989 | Stenger et al. . |
| 4,913,775 | 4/1990 | Langley et al. . |
| 5,004,550 | 4/1991 | Beckman et al. . |
| 5,126,014 | 6/1992 | Chung . |

FOREIGN PATENT DOCUMENTS 0 335 575 B1  3/1989  European Pat. Off. .

*Primary Examiner*—Neil McCarthy
*Attorney, Agent, or Firm*—Thomas M. Breininger; Elaine M. Ramesh; Kelly L. Cummings

[57] ABSTRACT

A method for the manufacture of paper comprising the steps of:
a) forming an aqueous cellulosic papermaking slurry;
b) adding an effective coagulating amount of a coagulant and a flocculant to said cellulosic papermaking slurry, wherein said coagulant is prepared by blending
 i) an effective coagulating amount of an aqueous conditioned colloidal silica sol with an average particle size within the range of from 1 to 150 nm and wherein the aqueous colloidal silica sol is conditioned by contacting said sol with a strong acid cation exchange resin, and
 ii) an effective coagulating amount of a cationically-charged water-soluble polymeric coagulant;
c) draining said cellulosic suspension to form a sheet; and,
d) drying said sheet.

The components of the invention are blended together so that addition is simultaneous. The colloidal silica is conditioned by passing over a cationic exchange resin prior to addition of cationic polymer. The term conditioned as used herein refers to the act of passing the colloidal silica over a cationic exchange resin.

5 Claims, 1 Drawing Sheet

♦ silica sol A
■ 17/1 weight ratio of conditioned silica sol A/poly(EPI/DMA) added sequentially
▲ 17/1 weight ratio of conditioned silica sol A/poly(EPI/DMA) blend
× 17/1 weight ratio of conditioned silica sol A/poly(EPI/DMA) blended and aged 24 hrs. prior to addition

- silica sol A
- 17/1 weight ratio of conditioned silica sol A/poly(EPI/DMA) added sequentially
- 17/1 weight ratio of conditioned silica sol A/poly(EPI/DMA) blend
- 17/1 weight ratio of conditioned silica sol A/poly(EPI/DMA) blended and aged 24 hrs. prior to addition

COLLOIDAL SILICA/POLYELECTROLYTE BLENDS FOR PULP AND PAPER APPLICATIONS

This application is a continuation-in-part of Ser. No. 08/535,430 entitled "Colloidal Silica/Polyelectrolyte Blends for Natural Water Clarification" by P. L. Choo, M. Kobayashi, D. A. Picco, and K. S. Salmen filed on Sep. 28, 1995, Ser. No. 08/613,791 entitled "Colloidal Silica/Polyelectrolyte Blends for Natural Water Clarification" by K. S. Salmen, P. L. Choo, D. A. Picco and M. Kobayashi filed on Nov. 26, 1995, now U.S. Pat. No. 5,620,629, and Ser. No. 08/701,224 entitled "Colloidal Silica/Polyelectrolyte Blends for Natural Water Clarification" by K. S. Salmen, P. L. Choo, D. A. Picco and M. Kobayashi filed on Aug. 21, 1996, now U.S. Pat. No. 5,667,697, the disclosures of which are all incorporated herein by reference.

FIELD OF THE INVENTION

A method for the manufacture of paper comprising the steps of: a) forming an aqueous cellulosic papermaking slurry; b) adding an effective coagulating amount of a coagulant and a flocculant to said cellulosic papermaking slurry, wherein said coagulant is prepared by blending i) an effective coagulating amount of an aqueous conditioned colloidal silica sol with an average particle size within the range of from 1 to 150 nm and wherein the aqueous colloidal silica sol is conditioned by contacting said sol with a strong acid cation exchange resin, and ii) an effective coagulating amount of a cationically charged water-soluble polymeric coagulant; c) draining said cellulosic suspension to form a sheet; and, d) drying said sheet.

The components of the invention are blended together so that addition is simultaneous. The colloidal silica is conditioned by passing over a cationic exchange resin prior to addition of cationic polymer. The term conditioned as used herein refers to the act of passing the colloidal silica over a cationic exchange resin.

BACKGROUND OF THE INVENTION

The papermaking process utilizes a papermaking slurry. An unusual feature of papermaking slurries, called furnishes, relative to most other slurries, is the large variations in the size and shape of the particles present. The relative sizes of some common paper furnish components may range from less than 1 micrometer, found for many mineral pigments or fillers, up to several millimeters in their largest dimension, found for the fibers.

In the papermaking process, the furnish must be dewatered. This is initially accomplished by the ejection of the furnish onto or between a filter fabric(s) called the wire. The openings in these wires are typically on the order of 200 mesh, which corresponds to a hole size capable of passing particles with a diameter of 76 um. Clearly, if no forces of attraction exist between particles, the mineral pigments would very easily pass through the wire and would not be retained in the sheet. Obviously, the benefits for which these mineral pigments or fillers are added can not be achieved if they are not retained in the sheet. Thus, under normal papermaking circumstances, many components of the furnish are smaller than the openings in the wire used to hold the wet fiber mat and will not be retained in the paper sheet without some sort of assistance. Besides fillers, fiber fines (small fragments of fiber) and various papermaking additives, such as sizing agents, also are small enough to pass through the openings in the wire, and these materials will also require assistance if they are to remain in sheet.

As the fibers form a mat on the wire, they generate their own filter media. Many of the smaller particles may be trapped by simple filtration in the fiber mat, particularly if the sheet is thick, i.e. high basis weight. Even if the basis weight is high, a significant fraction of the small particulate material may not be adequately retained, and when basis weights are low or machine turbulence prevents mat formation, the filtration mechanism of particle retention will be inadequate. Under those circumstances when the filtration mechanism is inadequate, chemical treatments generally called retention aids are required to modify the interparticle interactions thereby resulting in coagulation and/or flocculation of the particles.

The retention of the small particulate components leads to numerous benefits for the papermaker. Mineral fillers like clay and calcium carbonate are less expensive than fibers, and substitution of such fillers for fiber provides a way for the papermaker to reduce his raw material costs. Retention of fillers and fiber fines is also necessary to achieve the sheet properties needed for a given end use. Such properties might include sheet opacity, brightness, and appropriate ink interactions. Because the small particles have large surface areas for a given mass, significant amounts of additives such as dyes or sizing agents can be attached to them making retention of the fines necessary for effective utilization of such additives.

Fines which are not retained initially or on the so called first pass, are to a large extent recycled back into the system via the white water used to dilute the pulp. To some extent, the amount of fines retained in the sheet may be adjusted simply by increasing the fraction of fines in the furnish, which occurs naturally through the recycling of the white water. This approach to increasing retention is frequently unsatisfactory for several reasons. Some important and expensive materials lose their effectiveness upon recycling in the white water, and their retention on the first pass is needed for best performance. Examples of such materials are $TiO_2$ and alkaline sizing agents. Although the total amount of fines in the sheet may be increased in this way, their distribution in the sheet will tend to be very uneven, frequently resulting in two sidedness phenomena. These problems are effectively remedied by using retention aids.

Unretained materials naturally build up in the papermachines' white water systems. Many such materials can contribute to deposit problems on the machine which results in lost or slowed production and poor product quality. Frequently, good retention can continuously purge the system of these detrimental materials which go out of the system in the sheet. Consequently, a cleaner machine with improved runnability can be an additional benefit of a good retention program. Excess build up of materials in the white water eventually is wasted to the mill's waste treatment facility. In addition to a loss in raw materials, poor retention can generate an excessive load on the waste treatment facility. Clearly, application of a good retention program can be expected to alleviate this type of problem.

Retention is most needed in filler containing papers which consist primarily of fine papers used for writing and printing. For paper and board grades without fillers, like most newsprint, tissue, and box boards, retention is less important.

In addition to retention, many of the chemicals used as retention aids are also reported to improve the efficiency of water removal during the papermaking process. This is referred to as improved drainage or dewatering. Drainage on a papermachine is a rather complex issue because there are at least four distinct types of water removal processes taking place. The energy requirements and costs to remove a fixed amount of water increase upon passage of the sheet through the machine with the thermal drying being by far the most expensive. Consequently, removal of as much water as possible in the early stages of the process is desirable. The benefits of improved water removal can be achieved either by increasing production rates or by decreasing energy costs at fixed production rates.

How retention/drainage aids affect the water removal in the different sections of the papermachine appears to be different depending on the type of product being manufactured and is a very poorly understood area of the papermaking process. In fact, in some instances, retention aids have been found to slow production or dewatering.

In general, all paper and board machines can benefit from increased drainage. However, the use of retention/drainage aids to increase drainage is frequently limited because they adversely effect other sheet properties as dosages of those aids are increased.

With few exceptions, polymeric coagulants are cationic homopolymers of low to medium molecular weight ($10^3$–$10^6$ g/mole). Because of their modest molecular weights, they are normally simple solution polymers with concentrations in the range 15 to 55 wt %.

Since the homopolymers have high cationic charge densities, their activity in retention/drainage applications derives from their interactions with negatively charged papermaking components. The interactions lead to the standard surface charge neutralization and patch mechanisms of particle agglomeration. Due to the shear sensitivity and relatively small size of the flocs formed with polymeric coagulants, they are seldom used alone as retention aids but are generally employed in conjunction with a flocculent as a dual polymer program.

Although the details of dual polymer programs are not fully understood, the coagulant is believed: 1) to agglomerate particles into larger agglomerates which can be flocculated with less flocculent, 2) to provide sites of particle attachment when anionic flocculants are used, and 3) to prevent the strong adsorption of cationic flocculant with loss of polymer extension by partial neutralization of the anionic particle surfaces.

Hydrolyzable aluminum salts are used extensively as coagulants in papermaking. Iron salts are not used, however, because the color they generate is generally unacceptable. Papermakers' alum ($Al_2SO_4$) was historically the original retention/drainage aid and has wide usage and acceptance. Because of the acid generated by the aluminum hydrolysis, the pH of machines using alum is depressed, and the term "acid papermaking" is derived from the use of alum. The need for acid conditions originates from the fact that the hydrolyzed aluminum species present change as a function of pH and the species with the greatest coagulating capabilities are formed in the pH range between 4 and 6. Alkaline or neutral papermaking using $CaCO_3$ can obviously not tolerate these acid conditions, and little, if any, alum is used under such circumstances.

Partially neutralized $AlCl_3$s called polyaluminum chlorides or PACs are also effective inorganic coagulants. Being partially neutralized, they do not depress the pH to the extent that alum does and are generally more applicable over a wider range of pH.

The function of inorganic coagulants is the same as for the polymeric coagulants described above.

Because the polymeric and inorganic coagulants function primarily through charge mechanism, any additive containing cationic charge will also cause coagulation, and in fact, several common additives which are introduced for other reasons than coagulation do have cationic character. Generally, such products contain cationic components to enhance their own retention. The most common among these type of additives are: 1) cationic starch introduced for sheet strength, 2) sizing programs introduce to hydrophobize the sheet, and 3) wet strength agents to impart strength to the sheet when it is wetted. When such additives are present, the mill may be practicing a dual polymer program inadvertently with one or more of these additives acting as the coagulant. Additional coagulant is often needed even when these additives are present, however.

The following discussion highlights some conventional treatments. In U.S. Pat. No. 4,753,710 and 4,913,775, Langley et al. paper stocks may have both an inorganic additive and an organic polymeric material for the purpose of improving retention, drainage, drying and/or formation. For example, a stock may include bentonite, an aluminum sulfate coagulant, and a cationic polymer such as polyethylene imine to improve dewatering. Others have treated paper stock with a filler, a nonionic polyacrylamide, and bentonite. Still others have demonstrated that addition of either a cationic starch or cationic polyacrylamide and bentonite also improves retention. Another process which is believed to result in a suspension having good strength and satisfactory retention includes colloidal polysilicic acid and cationic starch additives.

In particular, U.S. Pat. No. 4,753,710 provides for the addition of an inorganic material such as bentonite after one of the shear stages, and an organic polymeric material such as substantially linear, synthetic, cationic polymer (e.g., a cationic polymer flocculent) having a molecular weight above 500,000 and which is added to the suspension before the shear stage in an amount which is at least about 0.03%, based on the dry weight of the suspension. It is also common to include a filler, such as, calcium carbonate, clay, titanium dioxide or talc or a combination, in the cellulosic suspension or paper stock. The filler is preferably incorporated into the stock before addition of the synthetic polymer.

The stock may include other additives such as rosin, alum, neutral sizes or optical brightening agents. It may also include a strengthening agent and this can be a starch, often a cationic starch. The pH of the stock is generally in the range of 4 to 9.

Another system uses the combination of cationic starch followed by colloidal silica to increase the amount of material retained on the web by the method of charge neutralization and adsorption of smaller agglomerates. This system is described in U.S. Pat. No. 4,388,150, inventors Sunder et al., issued Jun. 14, 1983.

U.S. Pat. No. 5,126,014, Chung, which issued on Jun. 30, 1992, discloses a chemical treatment program which replaces the high molecular weight cationic flocculent of the cationic coagulant/cationic flocculent/bentonite program disclosed in European Patent No. 0.335 575 with a high molecular weight anionic flocculent which resulted in a substantial improvement of the retention and drainage properties of the treated fine paper stock. This is particularly true when used in conjunction with cationic starch and precipitated calcium carbonate filler at neutral or alkaline pH. At pH values below 6.8, it has been discovered that cellulosic suspensions which include precipitated calcium carbonate filler become unstable, i.e., acidic pH will destabilize the carbonate.

Moreover, combinations of silica and polymers have been disclosed for some applications outside of the papermaking industry. The use of polymeric coagulants and aqueous colloidal silica sol for paint detackification is disclosed in U.S. Pat. Nos. 4,863,615; 5,004,550 and 4,153,548.

An improvement over U.S. Pat. No. 4,753,710 is disclosed in European Patent Publication No. 0 335 575, Langley et al., which was published on Oct. 4, 1989. This patent application was directed primarily to newsprint and board, wherein a low molecular weight cationic polymer, e.g., polyethylene imine, polyamines, polycyandiamide formaldehyde polymers, amphoteric polymers, and polymers of monomers selected from diallyl dimethyl ammonium chloride (DADMAC), diallylaminoalkyl (meth) acrylates and dialkylaminoalkyl (meth) acrylamides, is added to the fiber suspension, followed by addition of a high molecular weight cationic polymer or cationic starch, followed by the addition of bentonite or colloidal silicic acid after the shear stage. Moreover, a treatment of cationic coagulant, flocculant and colloidal silica was found to enhance the dewatering of paper in U.S. Pat. No. 4,795,531 to Sofia et al. The Langley and Sofia disclosures describe sequential additions. Neither of these references discloses a blend of polymer and silica. That is because prior to this invention, there was no effective blending of the two agents for treatment in a papermaking slurry. If an attempt had been made to blend them, an insoluble mixture would form which could not effectively be utilized in the papermaking slurry. The novel aspect of this invention is the pre-treatment or conditioning of the silica sol, which allows the formation of an effective and soluble blend.

SUMMARY OF THE INVENTION

Figure 1:
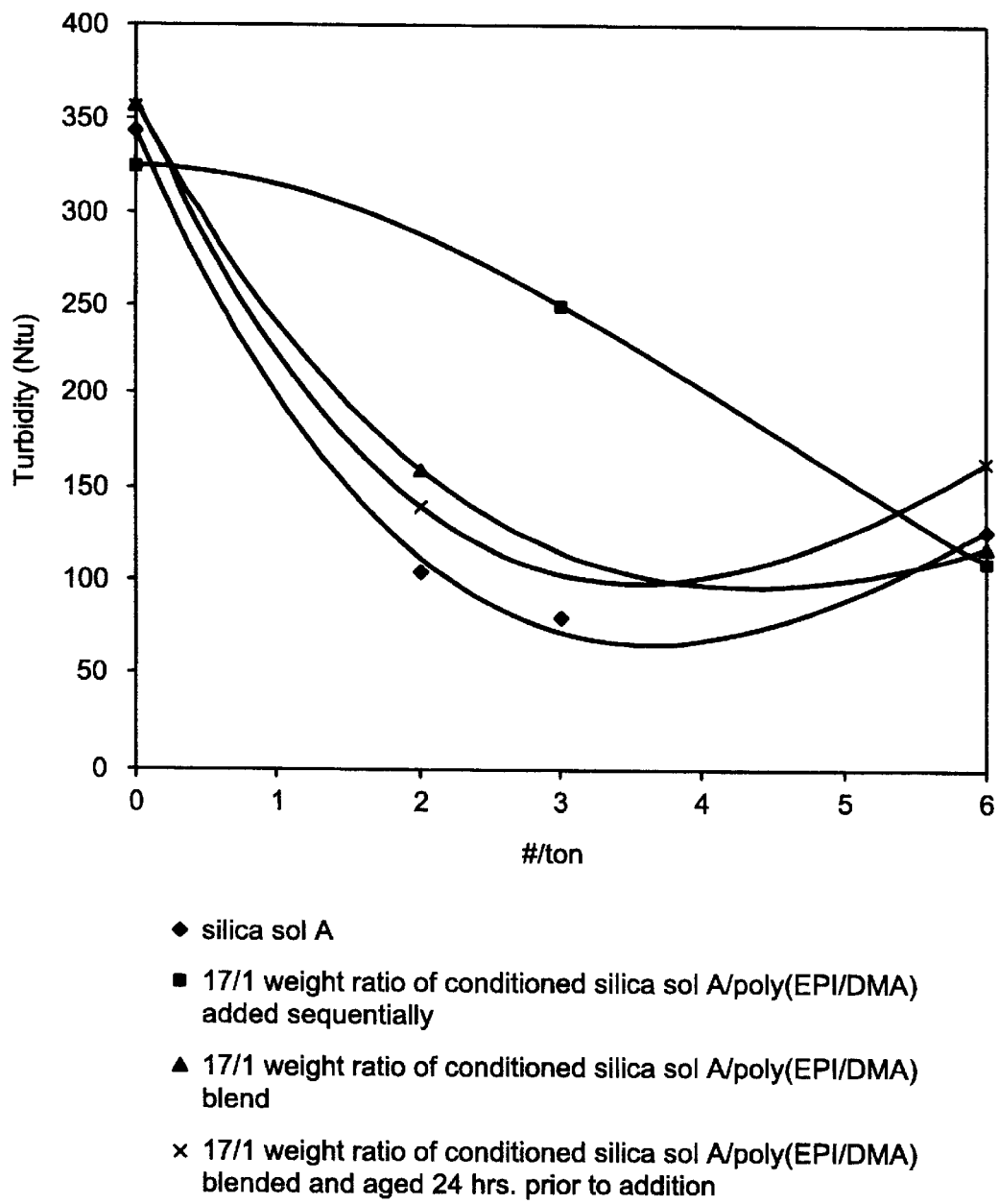
FIG. 1 is a graphical illustration of turbidity reduction results of Example 1.

A method for the manufacture of paper comprising the steps of:
 a) forming an aqueous cellulosic papermaking slurry;
 b) adding an effective coagulating amount of a coagulant and a flocculant to said cellulosic papermaking slurry, wherein said coagulant is prepared by blending
  i) an effective coagulating amount of an aqueous conditioned colloidal silica sol with an average particle size within the range of from 1 to 150 nm and wherein the aqueous colloidal silica sol is conditioned by contacting said sol with a strong acid cation exchange resin, and
  ii) an effective coagulating amount of a cationically charged water-soluble polymeric coagulant;
 c) draining said cellulosic suspension to form a sheet; and,
 d) drying said sheet.

The components of the invention are blended together so that addition is simultaneous. The colloidal silica is conditioned by passing over a cationic exchange resin prior to addition of cationic polymer. The term conditioned as used herein refers to the act of passing the colloidal silica over a cationic exchange resin.

DESCRIPTION OF THE INVENTION

A method for the manufacture of paper comprising the steps of:
 a) forming an aqueous cellulosic papermaking slurry;
 b) adding an effective coagulating amount of a coagulant and a flocculant to said cellulosic papermaking slurry, wherein said coagulant is prepared by blending
  i) an effective coagulating amount of an aqueous conditioned colloidal silica sol with an average particle size within the range of from 1 to 150 nm and wherein the aqueous colloidal silica sol is conditioned by contacting said sol with a strong acid cation exchange resin, and ii) an effective coagulating amount of a cationically-charged water-soluble polymeric coagulant;
 c) draining said cellulosic suspension to form a sheet; and,
 d) drying said sheet.

For the practice of this invention, said cationically-charged water-soluble polymeric coagulant and said silica may be blended as a weight ratio of silica to polymer of from 100:1 to 1:1. Preferably, said cationically-charged water-soluble polymeric coagulant and said silica sol may be blended as a weight ratio of silica to polymer of from 50:1 to 2:1. Most preferably, said cationically-charged water-soluble polymeric coagulant and said silica sol may be blended as a weight ratio of silica to polymer of from 25:1 to 5:1. Furthermore, for the practice of this invention, said cationically-charged water-soluble polymeric coagulant may be selected from the group consisting of poly (diallyldimethylammonium chloride), poly (diallyldimethylammonium chloride/acrylic acid), poly (diallyldimethylammonium chloride/acrylamide), poly (epichlorohydrin/dimethylamine), poly(epichlorohydrin/dimethylamine/ammonium), poly(ethyleneimine) and cationized starch. The above-described cationically-charged water-soluble polymeric coagulant may have a molecular weight range of from about 2,000 to about 2,000,000. The treatment may be added in the range of from one to twelve pounds per ton of papermaking slurry.

The cationic water-soluble polymer includes any water-soluble polymer which carries or is capable of carrying a cationic charge when dissolved in water, whether or not that charge-carrying capacity is dependent upon pH. The cationic water-soluble polymer may be poly(diallyldimethyl ammonium chloride), copolymers containing diallyldimethyl ammonium chloride and another monomer, poly (epichlorohydrin/dimethylamine), cationized starch or the like. Typically, the water-soluble cationic polymers have a molecular weight of about 2,000 to about 2,000,000.

Aqueous colloidal silica sols are produced by the neutralization with demetalization or deionization and subsequent concentration of sodium silicate. Likewise, aqueous colloidal silica sols can be produced by the hydrolysis of alkoxy silanes. The starting aqueous silica sol can range from 20 to 60 percent by weight of discrete, dense colloidal particles of amorphous silica. Typical commercial silica sols are those set forth below in Table I. The products listed below are all commercially available from Nalco Chemical Company, One Nalco Center, Naperville, Ill. 60563-1198. One method of the manufacture of the silica sols is set forth and described in U.S. Pat. No. 3,901,992, which is incorporated herein by reference.

TABLE I

| Silica Sol | % Silica | Specific Gravity | Particle Size (nm) | pH |
|---|---|---|---|---|
| A | 15 | 1.100 | 4 | 10.4 |
| B | 30 | 1.21 | 8 | 10.0 |
| C | 30 | 1.20 | 13 | 10.2 |
| D | 40 | 1.30 | 15 | 9.7 |
| E | 50 | 1.39 | 20 | 9.0 |
| F | 50 | 1.39 | 60 | 8.5 |

TABLE I-continued

| Silica Sol | % Silica | Specific Gravity | Particle Size (nm) | pH |
|---|---|---|---|---|
| G | 40 | 1.30 | 80 | 8.4 |
| H | 14.5 | 1.10 | 5 | 9.0 |
| I | 40 | 1.29 | 20 | 9.3 |
| J | 34 | 1.23 | 20 | 3.0 |

Aqueous silica sol stabilization by placing silica sols in contact with strong acid cationic exchange resins are disclosed in U.S. Pat. Nos. 3,867,304; 3,855,145 and 3,822,216, which are hereby incorporated by reference.

To make the blends, the colloidal silica solution must first be conditioned prior to combination with the polymeric treating agent. To condition the silica, a 15 percent by weight solution of silica with an average particle diameter of 4 nm is passed through an Amberlite IR-120 cationic exchange resin available from Rohm & Haas in Philadelphia, Pa. at a rate of 0.2 ml/min. A Dowex HGR-W2H cationic exchange resin may also be utilized. The cationic exchange resin is pre-treated with a 2N $HNO_3$ solution. Other acid solutions effective for this pretreatment are aqueous solutions of $H_2SO_4$ and HCl. After passing the silica through the cationic exchange resin, the desired polymeric treating agent coagulant was blended with the conditioned colloidal silica solution.

Flocculants which can be utilized for the practice of this invention are typically water-soluble vinylic polymers containing monomers of acrylamide, acrylic acid, AMPS, or admixtures thereof. They may also be acrylamide polymers such a way as to obtain sulfonate or phosphonate subsitution, or admixtures thereof.

The most preferred high molecular weight copolymer are acrylic acid/acrylamide copolymer; and sulfonate containing polymers, such as 2-acrylamido-2-methylpropane sulfonate/acrylamide; acrylamido methane sulfonate/acrylamide; 2-acrylamido ethane sulfonate/acrylamide; 2-hydroxy-3-acrylamide propane sulfonate/acrylamide. Commonly accepted counter ions may be used for the salts such as sodium ion, potassium ion, etc.

The acid or the salt form may be used. However, it is preferable to use the salt form of the charged polymers disclosed herein.

The anionic polymers may be used in solid, powder form, aqueous, or may be used as water-in-oil emulsions where the polymer is dissolved in the dispersed water phase of these emulsions.

It is preferred that the anionic polymers have a molecular weight of at least 500,000. The most preferred molecular weight is at least 1,000,000 with best results observed when the molecular weight is between 5–30 million. The anionic monomer should represent at least 2 mole percent of the copolymer and more preferably the anionic monomer will represent at least 20 mole percent of the over-all anionic high molecular weight polymers. By degree of substitution, we mean that the polymers contain monomer units containing chemical functionality which when dissolved in water become anionically charged, such as carboxylate groups, sulfonate groups, phosphonate groups, and the like. As an example a copolymer of acrylamide (AcAm) and acrylic acid (AA) wherein the AcAm:AA monomer mole ratio is 90:10, would have a degree of substitution of 10 mole percent. Similarly copolymers of AcAm:AA with monomer mole ratios of 50:50 would have a degree of anionic substitution of 50 mole percent. DMAEA.MCQ (dimethylaminoethyl acrylate methyl chloride quaternary salt)/AcAm copolymers are also useful polymers for the practice of this invention.

A method of producing cationized starch is disclosed in U.S. Pat. No. 4,568,721 which is hereby incorporated by reference.

The following examples are presented to describe preferred embodiments and utilities of the invention and are not meant to limit the invention unless otherwise stated in the claims appended hereto.

EXAMPLE 1

The following procedure was utilized to determine the efficiency of the invention for papermaking. In this procedure, evaluation of retention is performed gravimetrically by determination of the mass of material found in the filtrate. This procedure is essentially the same as that performed in a mill to determine first pass retention. Because this gravimetric procedure is very time consuming, the turbidity of the filtrate is often used as a parameter which is proportional to the concentration of solids suspended in the filtrate. This proportionality is strictly valid only under certain conditions, some of which are the homogeneous and constant composition of the suspension and a constant particle size distribution. These conditions are not likely to be fulfilled generally. The fillers are much better light scatterers than fiber fines, and consequently, for filled grades, the turbidity will be dominated heavily by the filler with little contribution from the fiber fines. The turbidity at best can yield only a single, total retention measurement and can not differentiate between total retention, ash retention, and fiber fines retention. for its increased reliability and the increased amount of information obtained.

A standard Britt jar experiment is performed to determine turbidity, which is an indicator of retention characteristics as described above. The Britt jar has an upper chamber of about one liter volume where the stock sample is mixed, and a bottom drainage chamber. The two sections are screwed together with a support screen and drainage screen (shiny side up) sandwiched between two gaskets. A drainage tube is stoppered into the base of the jar, which is held closed during treatment with a pinch clamp.

A sample of synthetic furnish (500 ml) was poured into the jar and mixed at a predetermined speed. The retention aid to be tested was added in the amount indicated in FIG. 1, wherein #/ton is a measure in pounds per ton. In each case, 0.3% of a flocculent (DMAEA.MCQ/AcAm copolymer) was also added to the synthetic furnish. The furnish and appropriate amount of treating agent were next mixed for a given time, then the pinch clamp was removed from the drainage tube allowing collection of filtrate. The jar drainage rate was controlled by using a drain tip yielding about 100 mL/30 seconds (the end of a 5 mL disposable pipet is convenient). Filtrate was collected over a 30 second period. Drainage rates should be slow enough to prevent any mat buildup.

The turbidity of the collected filtrate was analyzed using a turbidimeter. Lower NTU values of turbidity indicate that retention is enhanced. FIG. 1 illustrates the results of the study of the effects of the combinations of the instant invention as retention aids.

FIG. 1 shows that the colloidal silica/polymer blend performs in a manner similar to the conventional silica treatment, silica sol A from Table I. In the absence of any treatment, NTU values of approximately 345 are obtained. The sequentially added two-component system is not as efficient, as the data indicate. Therefore, the blend is superior to the sequentially-added combination. Comparable results are obtained if the conditioned silica sol and polymer are mixed and stored prior to application.

Changes can be made in the composition, operation and arrangement of the method of the present invention described herein without departing from the concept and scope of the invention as defined in the following claims:

We claim:

1. A method for the manufacture of paper comprising the steps of:
    a) forming an aqueous cellulosic papermaking slurry;
    b) adding an effective coagulating amount of a coagulant and a flocculant to said cellulosic papermaking slurry, wherein said coagulant is prepared by blending
        i) an effective coagulating amount of an aqueous conditioned colloidal silica sol with an average particle size within the range of from 1 to 150 nm and wherein the aqueous colloidal silica sol is conditioned by contacting said sol with a strong acid cation exchange resin, and
        ii) an effective coagulating amount of a cationically-charged water-soluble polymeric coagulant selected from the group consisting of poly (diallyldimethylammonium chloride), poly (diallyldimethylammonium chloride/acrylic acid), poly(diallydimethylammonium chloride/acrylamide), poly(epichlorohydrin/dimethylamine), poly(epichlorohydrin/dimethylamine/ammonium), poly(ethyleneimine) and cationized starch;
    c) draining said cellulosic suspension to form a sheet; and,
    d) drying said sheet.

2. The method of claim 1 wherein said cationically-charged water-soluble polymeric coagulant and said silica are blended as a weight ratio of silica to polymer of from 100:1 to 1:1.

3. The method of claim 1 wherein said cationically-charged water-soluble polymeric coagulant and said silica sol are blended as a weight ratio of silica to polymer of from 50:1 to 2:1.

4. The method of claim 1 wherein said cationically-charged water-soluble polymeric coagulant and said silica sol are blended as a weight ratio of silica to polymer of from 25:1 to 5:1.

5. The method of claim 1 wherein said cationically-charged water-soluble polymeric coagulant has a molecular weight range of from about 2,000 to about 2,000.000.

* * * * *